US012520957B2

(12) United States Patent
Coan et al.

(10) Patent No.: US 12,520,957 B2
(45) Date of Patent: Jan. 13, 2026

(54) PRODUCT DISPLAY ASSEMBLY

(71) Applicant: LIBERTY HARDWARE MFG. CORP., Winston-Salem, NC (US)

(72) Inventors: Yasmeen Gabrielle Coan, Winston-Salem, NC (US); Ryan Patrick Martin, Kernersville, NC (US); Christina Hurley, Winston-Salem, NC (US); Bonny Jean Lorick, Clemmons, NC (US)

(73) Assignee: LIBERTY HARDWARE MFG. CORP., Winston-Salem, NC (US)

(*) Notice: Subject to any disclaimer, the term of this patent is extended or adjusted under 35 U.S.C. 154(b) by 223 days.

(21) Appl. No.: 17/714,506

(22) Filed: Apr. 6, 2022

(65) Prior Publication Data

US 2022/0330723 A1 Oct. 20, 2022

Related U.S. Application Data

(60) Provisional application No. 63/175,109, filed on Apr. 15, 2021.

(51) Int. Cl.

*B65D 5/42* (2006.01)
*A47F 5/11* (2006.01)

(Continued)

(52) U.S. Cl.

CPC ............ *A47F 5/114* (2013.01); *B65D 5/4212* (2013.01); *B65D 5/522* (2013.01); *B65D 5/54* (2013.01); *G09F 3/10* (2013.01); *G09F 7/18* (2013.01)

(58) Field of Classification Search

CPC . A47B 87/008; A47F 3/14; A47F 5/10; A47F 5/11; A47F 5/114; A47F 5/116;

(Continued)

(56) References Cited

U.S. PATENT DOCUMENTS 3,357,543 A * 12/1967 Taggart ................ B65D 5/5253 229/162.6
4,852,330 A * 8/1989 Carangelo .......... B65D 71/0096 53/399

(Continued)

FOREIGN PATENT DOCUMENTS

CA 2803438 A1 5/2014
RU 2704030 C1 * 10/2019 ........... B65D 5/5495

(Continued)

OTHER PUBLICATIONS

Canada Office Action for Application No. 3,155,350, dated Mar. 7, 2024, 11 pages.

*Primary Examiner* — Anthony D Stashick
*Assistant Examiner* — Marcos Javier Rodriguez Molina
(74) *Attorney, Agent, or Firm* — Brooks Kushman P.C.; Lora Graentzdoerffer

(57) ABSTRACT

A display assembly is provided with a first display sized to receive a plurality of first products for display. A first display indicia portion is provided on the first display. A second display is sized to receive a plurality of second products for display. A second display indicia portion is provided on the second display. The first display indicia portion and the second display indicia portion cooperate to collectively provide complete display indicia.

22 Claims, 13 Drawing Sheets

(51) Int. Cl.

| | |
|---|---|
| ***B65D 5/52*** | (2006.01) |
| ***B65D 5/54*** | (2006.01) |
| ***G09F 3/10*** | (2006.01) |
| ***G09F 7/18*** | (2006.01) |
| *A47B 87/00* | (2006.01) |
| *G06F 1/10* | (2006.01) |

(58) Field of Classification Search
CPC ......... A47F 7/00; B65D 21/02; B65D 21/086; B65D 25/10; B65D 5/06; B65D 5/52; B65D 5/522; G09F 1/00; G09F 23/00; G09F 7/18
See application file for complete search history.

(56) References Cited

U.S. PATENT DOCUMENTS

| | | | | | |
|---|---|---|---|---|---|
| 5,039,002 | A * | 8/1991 | Spamer | B65D 5/448 | 229/199 |
| 5,228,590 | A * | 7/1993 | Blasko | A47F 1/08 | 220/501 |
| 5,300,342 | A | 4/1994 | Long | | |
| 5,513,745 | A * | 5/1996 | Zoltan | A47F 5/114 | 211/132.1 |
| 6,050,419 | A * | 4/2000 | Flanagan | B65D 71/0096 | 53/399 |
| 6,658,813 | B2 | 12/2003 | Clay | | |
| 7,131,543 | B2 * | 11/2006 | Mason | A47F 5/0018 | 211/59.2 |
| 7,438,186 | B2 * | 10/2008 | Markson | A47F 5/0025 | 206/745 |
| 8,579,389 | B1 * | 11/2013 | Kuo | A47B 87/008 | 312/111 |
| 8,602,213 | B2 | 12/2013 | Lowery et al. | | |
| 8,973,811 | B2 | 3/2015 | McLeod et al. | | |
| 10,617,233 | B2 * | 4/2020 | Ertl | B65D 21/086 | |
| 2003/0052040 | A1 * | 3/2003 | Brener | B65D 5/52 | 206/736 |
| 2003/0172561 | A1 * | 9/2003 | Miller | G09F 23/00 | 40/312 |
| 2008/0105593 | A1 * | 5/2008 | Kleinsmith | A47F 3/14 | 206/736 |
| 2012/0018393 | A1 * | 1/2012 | Brown | B65D 71/0088 | 211/59.4 |
| 2016/0318653 | A1 * | 11/2016 | Pfeifer | B65D 5/5038 | |
| 2019/0216237 | A1 | 7/2019 | Austin, III et al. | | |

FOREIGN PATENT DOCUMENTS

| | | | | |
|---|---|---|---|---|
| WO | 2005047118 | A2 | 5/2005 | |
| WO | WO-2009049308 | A1 * | 4/2009 | B65D 5/542 |

* cited by examiner

PRODUCT DISPLAY ASSEMBLY

CROSS-REFERENCE TO RELATED APPLICATIONS

This application claims the benefit of U.S. provisional application Ser. No. 63/175,109 filed Apr. 15, 2021, the disclosure of which is hereby incorporated in its entirety by reference herein.

TECHNICAL FIELD

Various embodiments relate to product display assemblies for display and retail of products.

BACKGROUND

Product packaging and displays are illustrated and described in Austin, III, et al., United States Patent Application Publication Number US 2019/0216237 A1, which published to Liberty Hardware Mfg. Corp., on Jul. 18, 2019.

SUMMARY

According to an embodiment, a display assembly is provided with a first display sized to receive a plurality of first products for display. A first display indicia portion is provided on the first display. A second display is sized to receive a plurality of second products for display. A second display indicia portion is provided on the second display. The first display indicia portion and the second display indicia portion cooperate to collectively provide complete display indicia.

According to a further embodiment, a connector is provided to connect the first display and the second display.

According to an even further embodiment, a third display indicia portion is provided on the connector. The first display indicia portion, the second display indicia portion, and the third display indicia portion cooperate to collectively provide complete display indicia.

According to another even further embodiment, the connector is further provided as a sticker.

According to another even further embodiment, the connector is formed integrally with the first display or the second display.

According to another further embodiment, the connector is further provided with a panel that extends from the first display to overlap and connect to the second display.

According to another even further embodiment, the connector is provided with a band sized to extend about an overall perimeter of the combined first and second displays.

According to an even further embodiment, a first plurality of notches is formed into the first display or the second display. A second plurality of notches is formed into the band for fit and alignment with the notches in the first display or the second display.

According to another even further embodiment, a slot is formed in the first display or the second display. A tab oriented is on the band to be received in the slot to fasten and align the band to the first display or the second display.

According to another further embodiment, an inner side panel of the first display is unornamented for side-by-side placement with the second display.

According to another further embodiment, a header is sized to be attached to the first display or the second display.

According to another further embodiment, each indicia portion provides a portion of a logo, banner, signage, graphic, or product information.

According to another further embodiment, the first display indicia portion is incomplete.

According to an even further embodiment, the first display indicia portion includes an unprinted area.

According to another further embodiment, the plurality of first products is received and displayed within the first display. The plurality of second products is received and displayed within the second display.

According to an even further embodiment, the plurality of first products is further provided as packaged faucets.

According to another even further embodiment, the plurality of second products is further provided as bath hardware.

According to another embodiment, a display connector is sized to connect at least two separate product displays. The display connector is provided with at least one panel with an incomplete display indicia portion to cooperate with the at least two separate product displays to collectively provide complete display indicia.

According to another embodiment, a method to display products at retail receives a first display with a plurality of first products. A second display is received with a plurality of second products. The first display is displayed in a retail location. The second display is displayed in the retail location. The first display is assembled to the second display so that the first and second displays collectively provide display indicia.

According to a further embodiment, the first display is connected to the second display with a connector.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
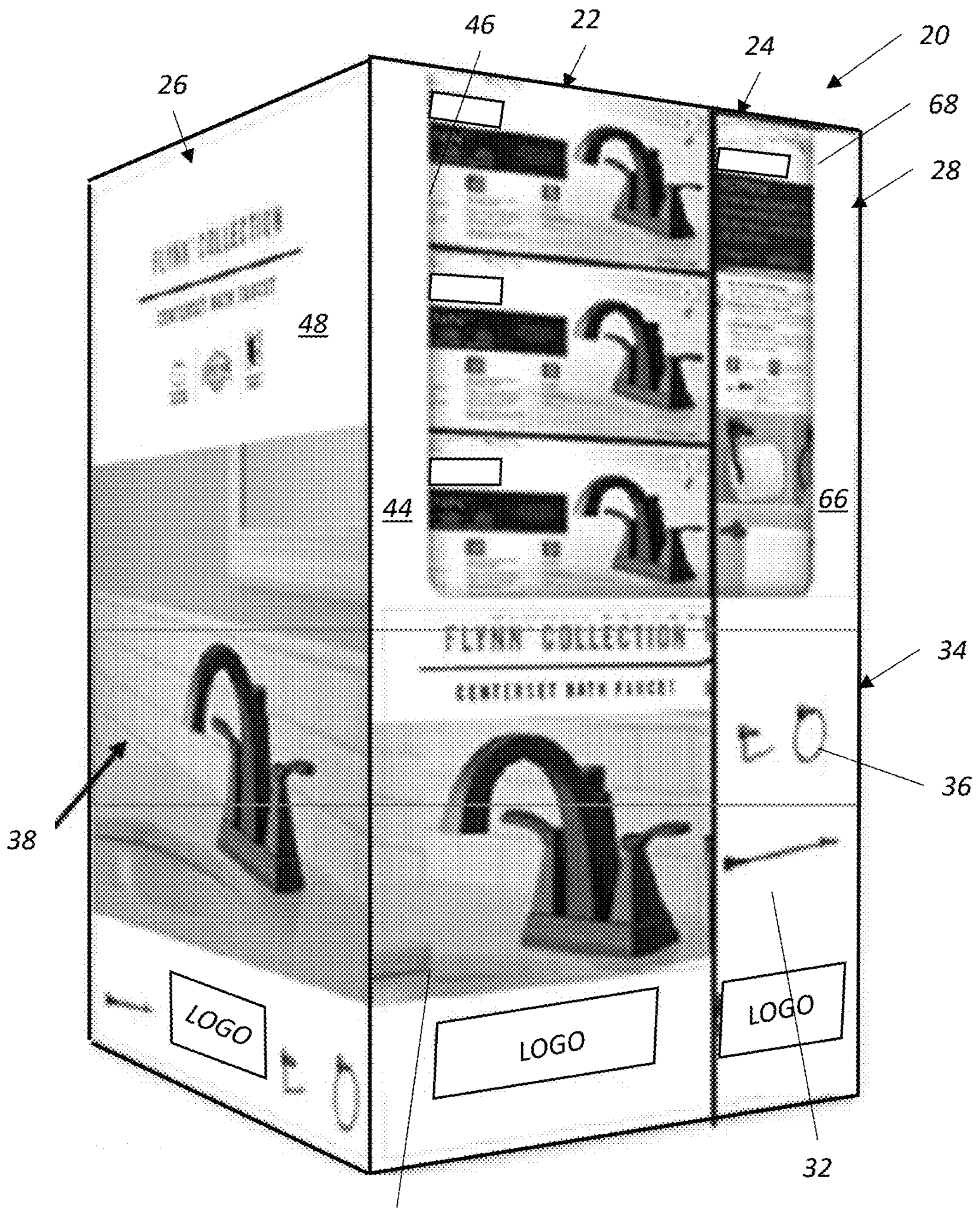
FIG. 1 is a front perspective view of a retail product display assembly according to an embodiment.

FIG. 1 illustrates a retail product display assembly 20 according to an embodiment. The display assembly 20 is sized to be placed and displayed at a retail location, such as upon a retail floor for display, retail, and sale of displayed products. The display assembly 20 may also be sized to be placed into a side or an endcap area of aisle at retail. The display assembly 20 may be a stand-alone merchandiser for display within an aisle, at an end of aisle, near a register checkout area, within a bay inside an aisle, and/or separate from shelving units within retail aisles. The display assembly 20 may be a sidekick, whereby the display assembly 20 hangs on an endcap. The display assembly 20 may be placed in a separate part of the retail facility than where the products are typically displayed in order to encourage customers to other areas of the store.

The display assembly 20 includes multiple arrays 22, 24 of products. Although two product arrays 22, 24 are illustrated, any quantity of product arrays 22, 24 may be employed. Each product array 22, 24 includes a plurality of products 22, 24. The two pluralities of products 22, 24 differ and may be products that are displayed together for a promotion, a sale, or cross-selling of the products 22, 24. The products 22, 24 may match or complement each other; and may be displayed together to encourage a customer to combine, match and purchase both products 22, 24. For the displayed embodiment, the first plurality of products 22 are illustrated as packaged faucets 22. The second plurality of products 24 are illustrated as a packaged kit 24 of bath hardware including a toilet paper holder, a towel ring, and a towel bar. Any retail products and combinations of retail products may be displayed in the product display assembly 20.

Figure 2:
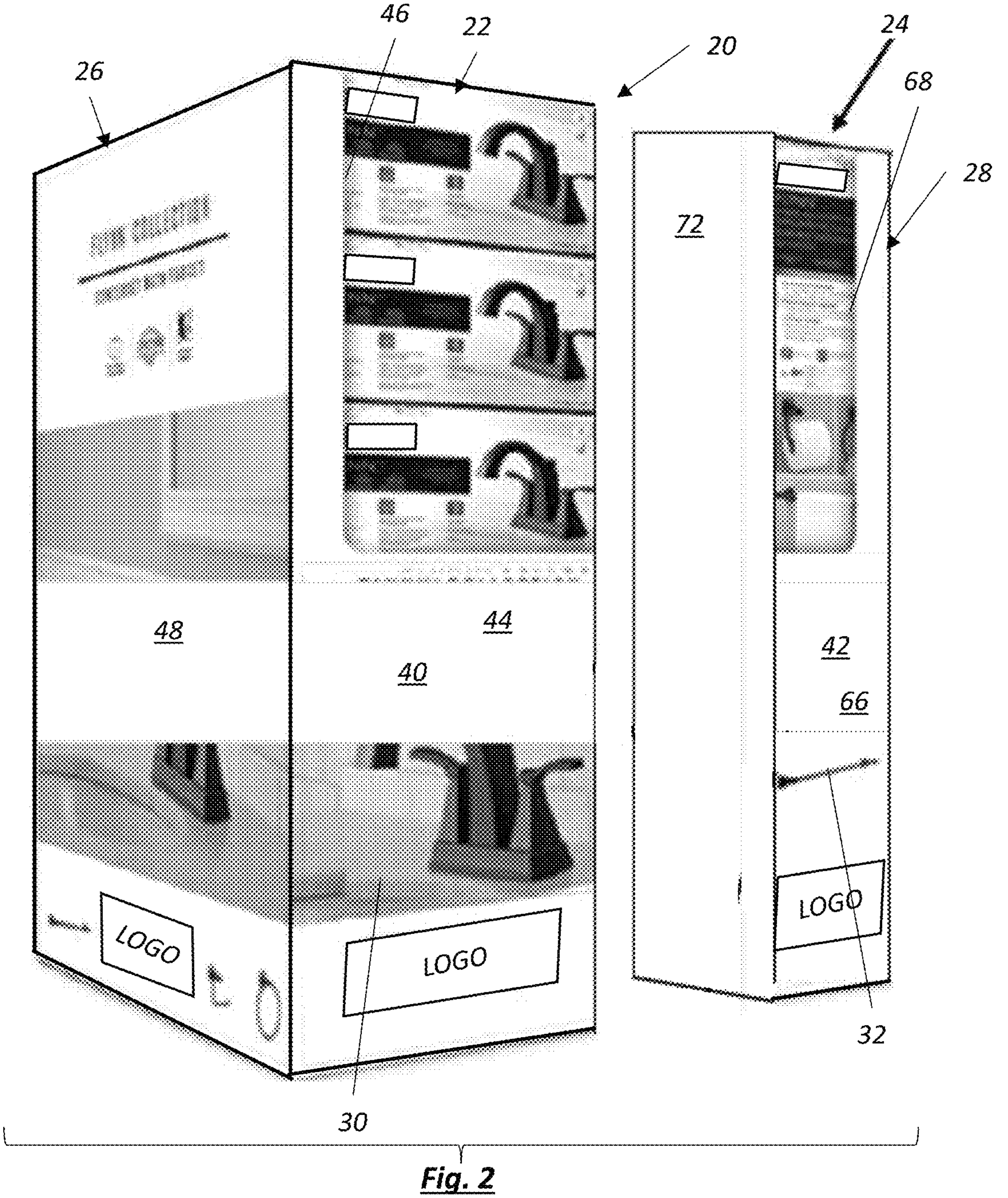
FIG. 2 is an exploded perspective view of the retail product display assembly of FIG. 1, according to an embodiment.

The display assembly 20 includes a first display 26 for retaining and displaying the first plurality of products 22. The display assembly 20 also includes a second display 28 for retaining and displaying the second plurality of products 24. Each of the displays 26, 28 are separate stand-alone displays 26, 28 that are combined to provide the display assembly 20. The displays 26, 28 can each be formed from cardboard, corrugated cardboard, plastic, or any suitable material. FIG. 2 illustrates the first display 26 and the second display 28 separated. The dedicated displays 26, 28 can be utilized for shipping the displays 26, 28 with the products 22, 24 to the retailer. The retailer can display the products 22, 24 within the displays 26, 28 without unpacking and stocking the products 22, 24.

By providing the first plurality of products 22 in the first display 26, and the second plurality of products 24 in the second display 28, the products 22, 24 can be shipped from the manufacturer to the retailer. If both products 22, 24 were manufactured at different facilities, then both products 22, 24 would need to be combined to be packaged in a common display. The combination may be packaged together into one unit by the retailer. Alternatively, a filler may be added to the package with the first products, and shipped to the manufacturer of the second products for removal of the filler and packaging of the second products. These extra steps of packaging, shipping, and unpackaging for providing dissimilar products in one display are avoided with separate displays 26, 28. Therefore, the separate displays 26, 28 save time and costs associated with manufacturing, labor, and shipping. Additionally, when the combined products 22, 24 are provided by different companies, the retailer can purchase the products 22, 24 directly from the companies to avoid a separate sales transaction between the manufacturers of the products 22, 24.

The separate product displays 26, 28 can be combined on the retail floor by the retailer. Alternatively, the retailer can combine the displays 26, 28 elsewhere and place the combined display assembly 20 on the retail floor. In another option, one manufacturer may ship one of the displays 26, 28 to the other manufacturer for combination at a manufacturer facility. In another option, both manufacturers may ship the displays 26, 28 to a third party for assembly of the product display assembly 20 that is then delivered to the retailer.

The first display 26 includes a first indicia portion 30. Likewise, the second display 28 includes a second indicia portion 32. Each indicia portion 30, 32 provides a portion of a logo, banner, signage, graphic, product information, or the like. At least one of the indicia portions 30, 32 may be incomplete. According to the depicted embodiment, both of the indicia portions 30, 32 are incomplete. According to one embodiment, both of the indicia portions 30, 32 collectively provide complete display indicia.

Figure 3:
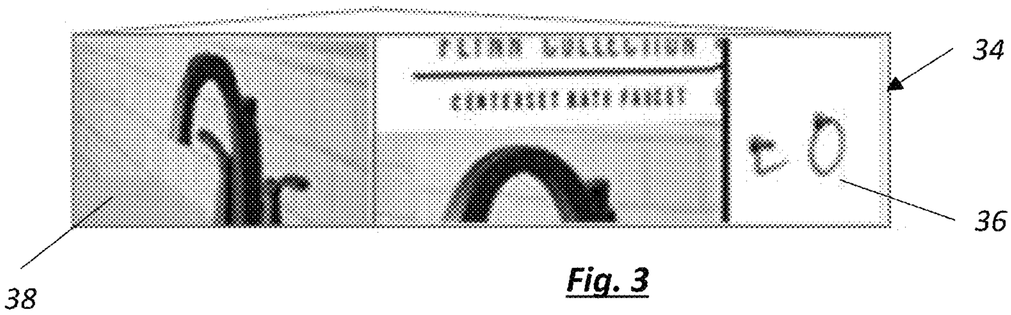
FIG. 3 is a perspective view of a connector of the retail product display assembly of FIG. 1, according to an embodiment.

According to at least another embodiment, the display assembly 20 includes a connector 34 for connecting the first display 26 to the second display 28. In the depicted embodiment, the connector 34 is a band sized to extend about an overall perimeter of the combined first and second displays 26, 28, which is often referred to as a bellyband. According to another embodiment, the connector 34 is formed integrally with one, or both of the first and second displays 26, 28. The connector 34 is illustrated in FIG. 3 removed from the display assembly 20. The connector 34 can be manufactured from various materials, such as corrugated materials, paperboard, paper, plastic, printed shrink wrap, or the like. The connector 34 can be formed as a strip that wraps around the displays 26, 28, and is connected by a fastener, such as tape, staples, adhesives, clips, or the like.

The connector 34 includes a plurality of panels, including a front panel 36 and a side panel 38. The front panel 36 and the side panel 38 each include an incomplete display indicia portion across the panels 36, 38. The display indicia portions of the panels 36, 38 cooperate with the indicia portions 30, 32 of the displays 26, 28 to collectively provide complete display indicia. Therefore, once the band 34 is connected to the displays 26, 28, the display assembly 20 appears complete with complete indicia as depicted in FIG. 1.

Referring again to FIG. 2, each of the displays 26, 28 include an unprinted area 40, 42. The unprinted areas 40, 42 are provided within the indicia portions 30, 32. The incomplete indicia portions 30, 32 of the displays 26, 28 encourage a retailer to combine the displays 26, 28 at retail, and minimize inadvertent display before the combination. Additionally, the unprinted areas 40, 42 encourage a retailer to connect the displays 26, 28 with the band 34 to complete the indicia of the display assembly 20, while completing the display assembly 20.

Figure 4:
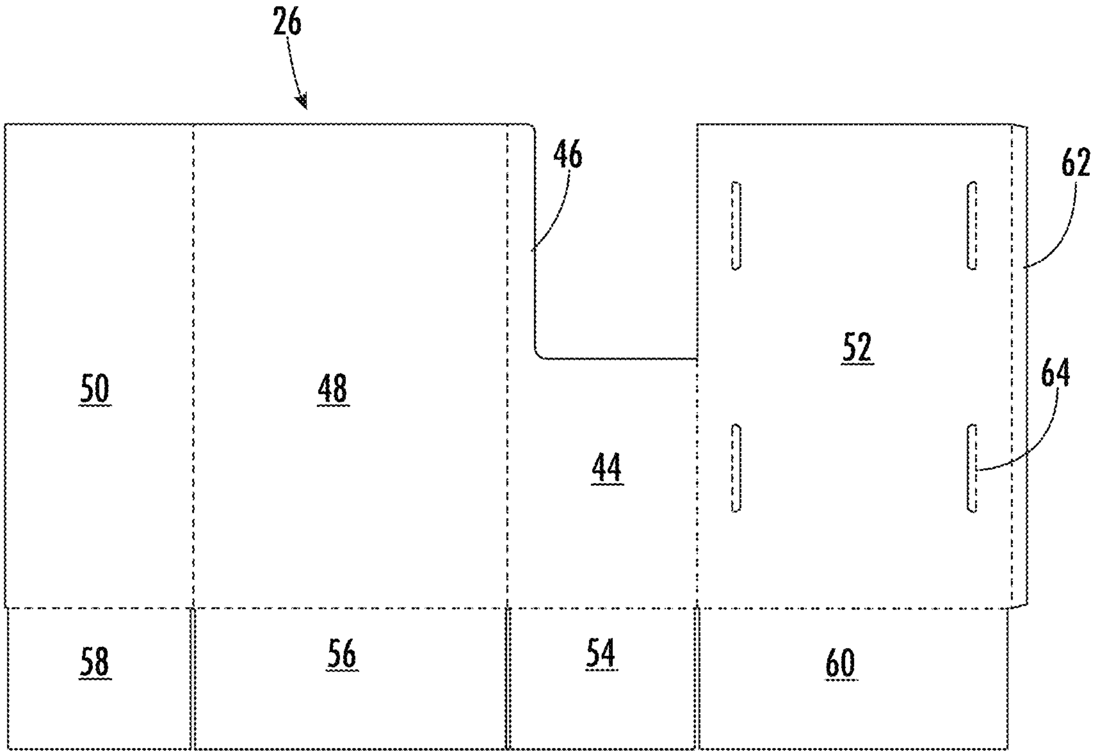
FIG. 4 is a plan view of a die layout for a display of the retail product display assembly of FIG. 1, according to an embodiment.

FIG. 4 illustrates a die panel layout of the first display 26. The first display 26 includes a front panel 44. A cutout 46 is formed through the front panel 44 for access to the displayed products 22. An outer side panel 48 is pivotally connected to the front panel 44. A rear panel 50 is pivotally connected to the outer side panel 48. The first indicia portion 30 is formed on the front panel 44, the outer side panel 48, and the rear panel 50.

An inner side panel 52 is also pivotally connected to the front panel 44. Bottom panels 54, 56, 58, 60 are each pivotally connected to a lower end of one of the upright panels 44, 48, 50, 52 of the display 26. When each of the upright panels 44, 48, 50, 52 are folded perpendicularly to sequential panels 44, 48, 50, 52, the bottom panels 54, 56, 58, 60 are folded inward to enclose the bottom of the display 26. A tab 62 is pivotally connected to the inner side panel 52 to be folded into the display 26. The tab 62 is adhered or otherwise fastened to an inside of the rear panel 50 to enclose and fasten the upright panels 44, 48, 50, 52.

The inner side panel 52 of the display 26 is left unornamented for side-by-side placement with the display 28. A plurality of tabs 64 can also be formed in the inner side panel 52 for connecting the first display 26 to the second display 28. Alternatively, other fasteners may be provided on the panel 52, such as adhesive, double-sided adhesive, tape, fasteners, hook and loop fasteners, and the like.

Figure 5:
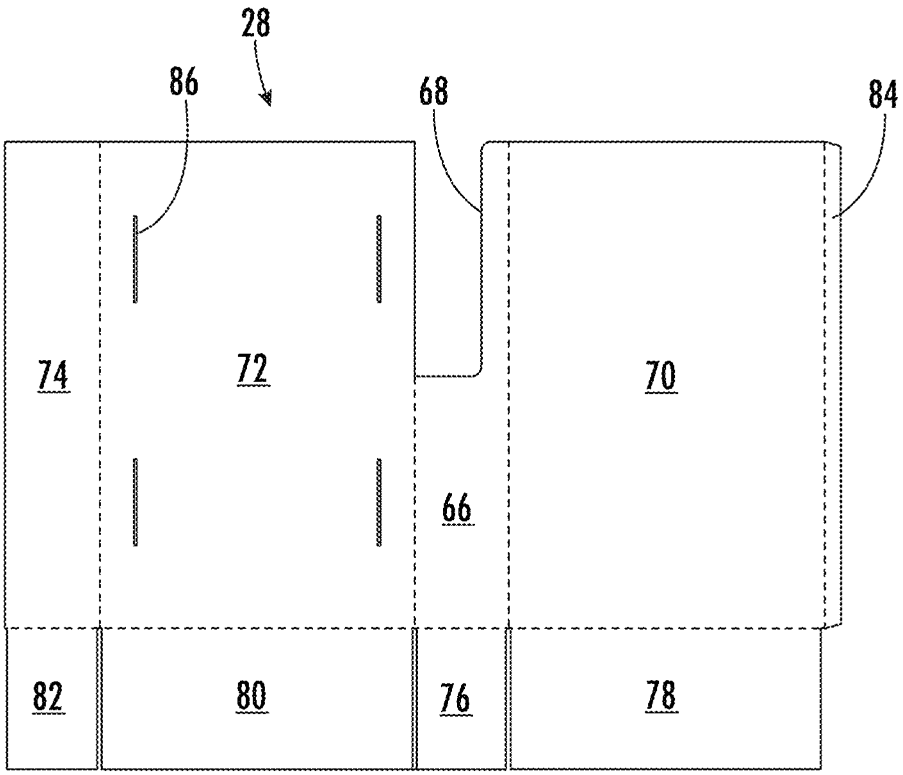
FIG. 5 is a plan view of a die layout for another display of the retail product display assembly of FIG. 1, according to an embodiment.

FIG. 5 illustrates a die panel layout of the second display 28. The second display 28 includes a front panel 66. A cutout 68 is formed through the front panel 66 for access to the displayed products 24. The cutout 68 is sized to align with the cutout 46 of the display 26. The cutouts 46, 68 of the displays 26, 28 finish each other to help orient the displays 26, 28 together. Although complementary cutouts 46, 68 are illustrated and described, separate central cutouts may be employed according to an embodiment. According to another embodiment, a dump bin design without front cutouts could be utilized for displays 26 and 28, whereby products are loaded and visible in an area above panel 44 in display 26 and panel 66 in display 28.

An outer side panel 70 is pivotally connected to the front panel 66. An inner side panel 72 is also pivotally connected to the front panel 66. A rear panel 74 is pivotally connected to the inner side panel 72. The second indicia portion 32 is formed on the front panel 66, the outer side panel 70, and the rear panel 74.

Bottom panels 76, 78, 80, 82 are each pivotally connected to a lower end of one of the upright panels 66, 70, 72, 74 of the display 28. When each of the upright panels 66, 70, 72, 74 are folded perpendicularly to sequential panels 66, 70, 72, 74, the bottom panels 76, 78, 80, 82 are folded inward to enclose the bottom of the display 28. A tab 84 is pivotally connected to the outer side panel 70 to be folded into the display 28. The tab 84 is adhered or otherwise fastened to an inside of the rear panel 74 to enclose and fasten the upright panels 66, 70, 72, 74.

The inner side panel 72 of the display 28 is left unornamented for side-by-side placement with the display 26. According to another embodiment, the inner side panel 72 may be ornamented so that the display 28 may be displayed separately. A plurality of slots 86 can also be formed in the inner side panel 72 for receiving the tabs 64 of the first display 26 to connect the first display 26 to the second display 28.

Figure 6:
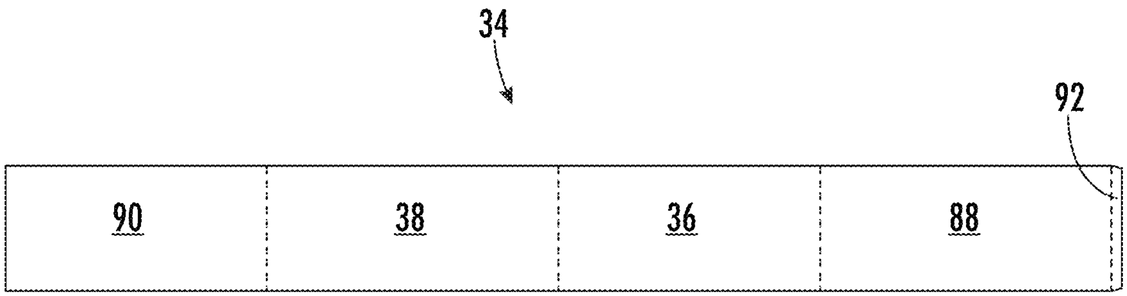
FIG. 6 is a plan view of a die layout for a connector of the retail product display assembly of FIG. 1, according to an embodiment.

Referring now to FIG. 6, the band 34 is illustrated in a die layout. The front panel 36 of the band 34 is sized to extend across the combined front panels 44, 66 of the displays 26, 28. The side panel 38 is sized to extend across the outer side panel 48 of the display 26. A second side panel 88 is pivotally connected to the front panel 36 to extend about the outer side panel 70 of the display 28. A rear panel 90 is pivotally connected to the first side panel 38 to extend across the combined rear panels 50, 74 of the display 26, 28. A tab 92 is pivotally connected to the second side panel 88 to extend inside the rear panel 90 and to fasten to the rear panel 90.

Referring again to FIG. 1, the display assembly 20 is sized to structural and dimensional requirements and specifications as set forth by the retailer and/or the manufacturers. The two merchandisers, or displays 26, 28 are received and assembled together with the band 34 slid over the top of the displays 26, 28. The assembled display assembly 20 conceals incomplete surfaces for a complete and harmonic appearance. The incomplete indicia provide an indication to the retailer when assembly is incomplete, and to motivate completion of the assembly 20. The band 34 can be provided by the supplier of one of the displays 26, 28. The band 34 can be preassembled and folded flat for ease in shipping. At assembly, the band 34 can be expanded and slid over the displays 26, 28. The band 34 can also be provided around one of the displays 26, 28, with an extra overlap folded, or otherwise minimized for expansion at assembly.

Figure 7:
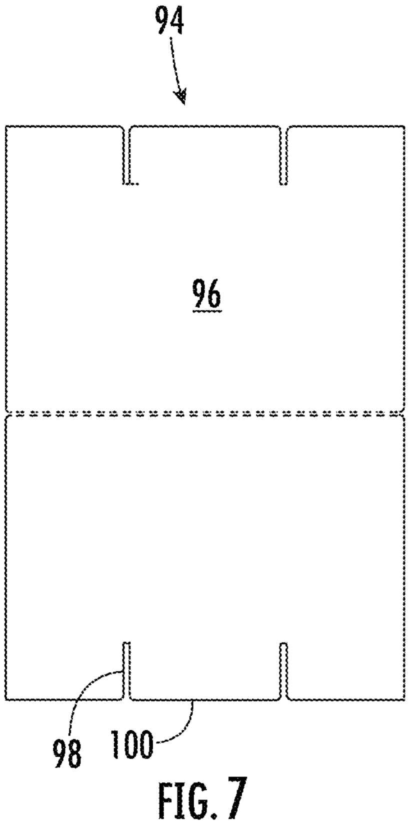
FIG. 7 is a plan view of a die layout for another connector of the retail product display assembly of FIG. 1, according to an embodiment.

FIG. 7 illustrates a header 94 according to an embodiment. The header 94 is illustrated as a die print layout. The header 94 is provided by a pair of pivotally connected panels 96. A pair of slots 98 are formed through the panels 96 to connect the header 94 to the display assembly 20. The slots 98 provide a series of alternating tabs 100 in the panels 96 between the slots 98 for alternating on either side of a panel. The header 94 may be printed with signage, a banner, graphics, or the like to draw consumer attention to the display assembly 20. Additionally, the header 94 provides additional securement for connecting and securing the combined displays 26, 28. The header 94 may be sized to extend a width of the combined rear panels 50, 74. The header 94 may also be attached to the combined rear panels 50, 74 to extend above the display assembly 20. The header 94 can be shipped with one of the displays 26, 28 for assembly with the display assembly 20.

Various components of the display assembly 20 may include assembly instructions and printed orientation marks to ensure proper alignment and installation to complete the display assembly 20 and the associated graphics.

Figure 8:
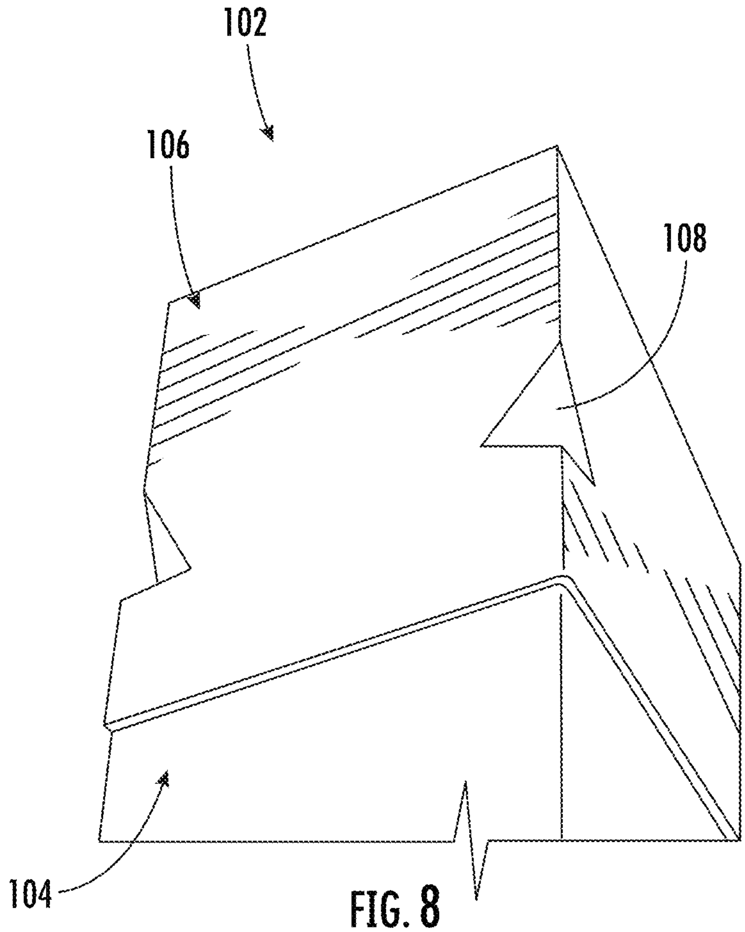
FIG. 8 is a partial perspective view of a retail product display assembly according to another embodiment.

FIG. 8 illustrates a partial display assembly 102 according to another embodiment.

The display assembly 102 includes a quantity of displays 104. A band 106 is slid over the displays 104. A plurality of notches 108 are formed into the band 106. A corresponding plurality of the notches are formed into the displays 104 to receive the notches 108 of the band 106 for fit and alignment of the band 106.

Figure 9:
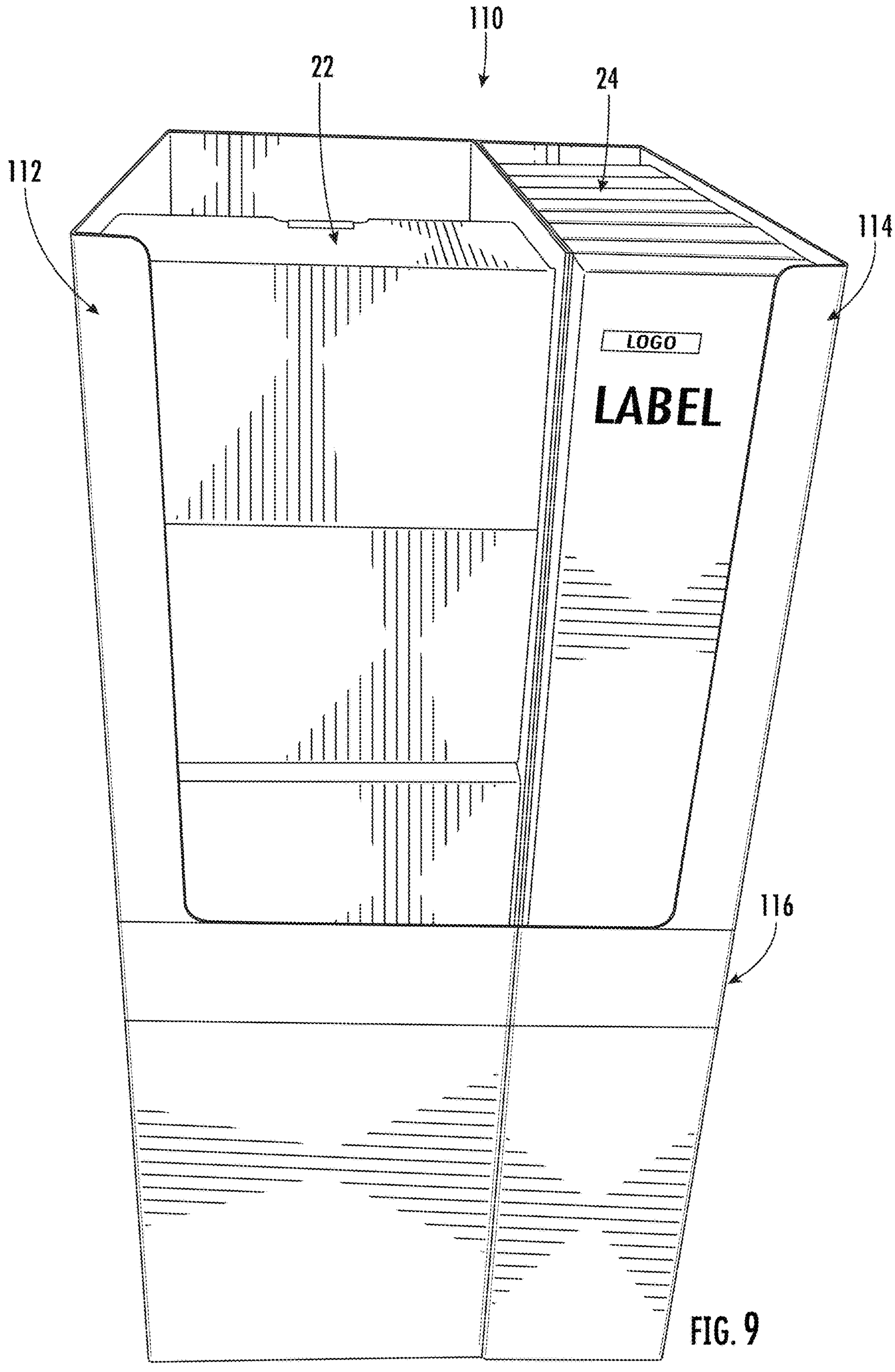
FIG. 9 is a front perspective view of a retail product display assembly according to another embodiment.
Figure 10:
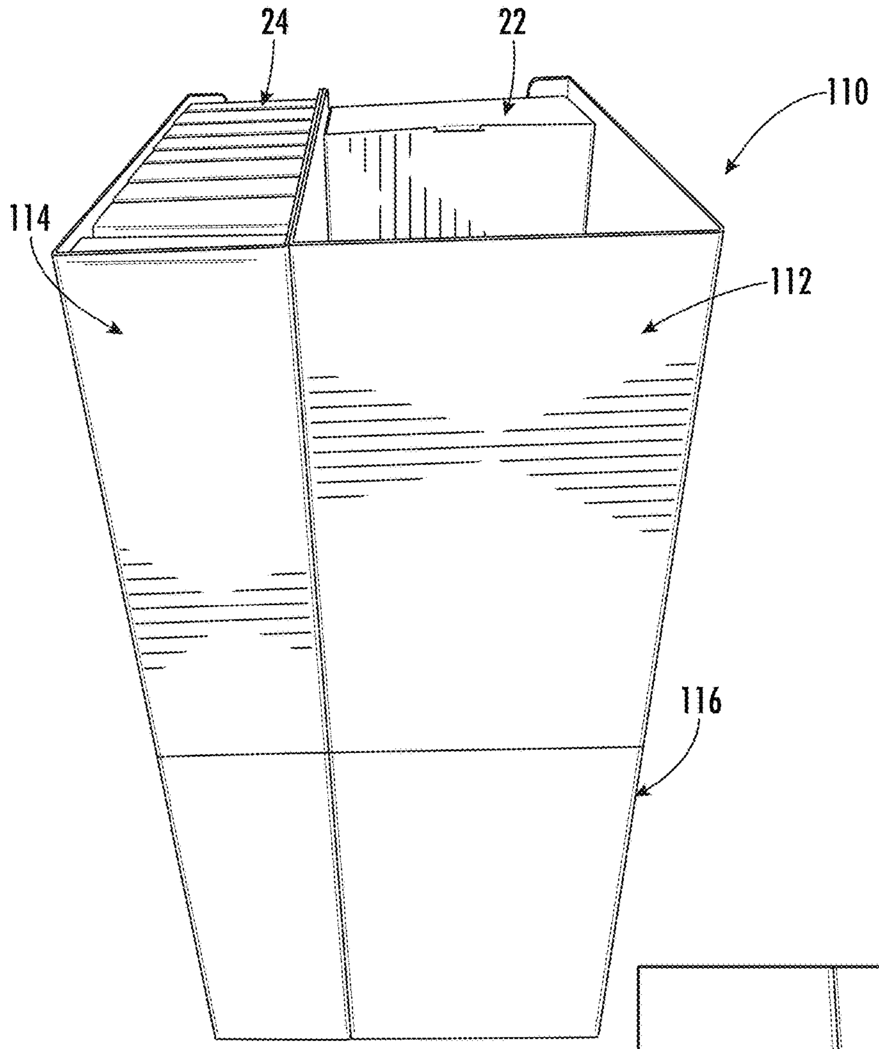
FIG. 10 is a rear perspective view of the retail product display assembly of FIG. 9.
Figure 11:
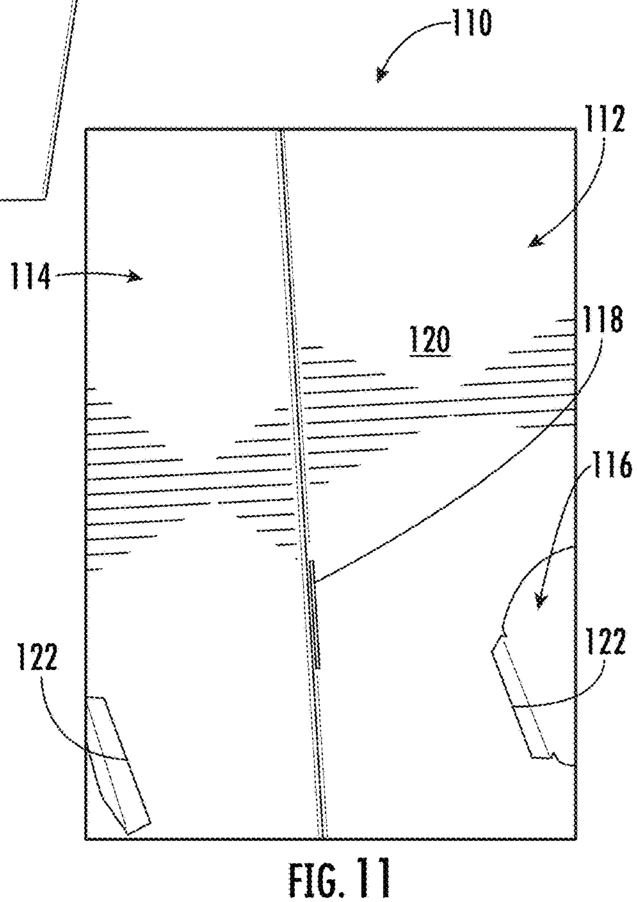
FIG. 11 is an enlarged rear perspective view of the retail product display assembly of FIG. 9, illustrated during assembly.

FIGS. 9-11 illustrate a display assembly 110 according to another embodiment.

Similar to the prior embodiments, the display assembly 110 includes displays 112, 114 for retaining and displaying the products 22, 24. A band 116 is provided about the displays 112, 114 for connecting the displays 112, 114 and for completing an ornamental appearance about the displays 112, 114. As illustrated in FIG. 11, a slot 118 is formed in a rear panel 120 of the display 112. In the depicted embodiment, the slot 118 is oriented in the rear panel adjacent to the second display 114. A pair of tabs 122 may be provided on terminal ends of the band 116 to be fastened into the slot 118. The tabs 122 and the slot 118 cooperate to attach the band 116 to the displays 112, 114, while aligning the band 116 with the displays 112, 114 for completeness of the collective indicia.

Figure 12:
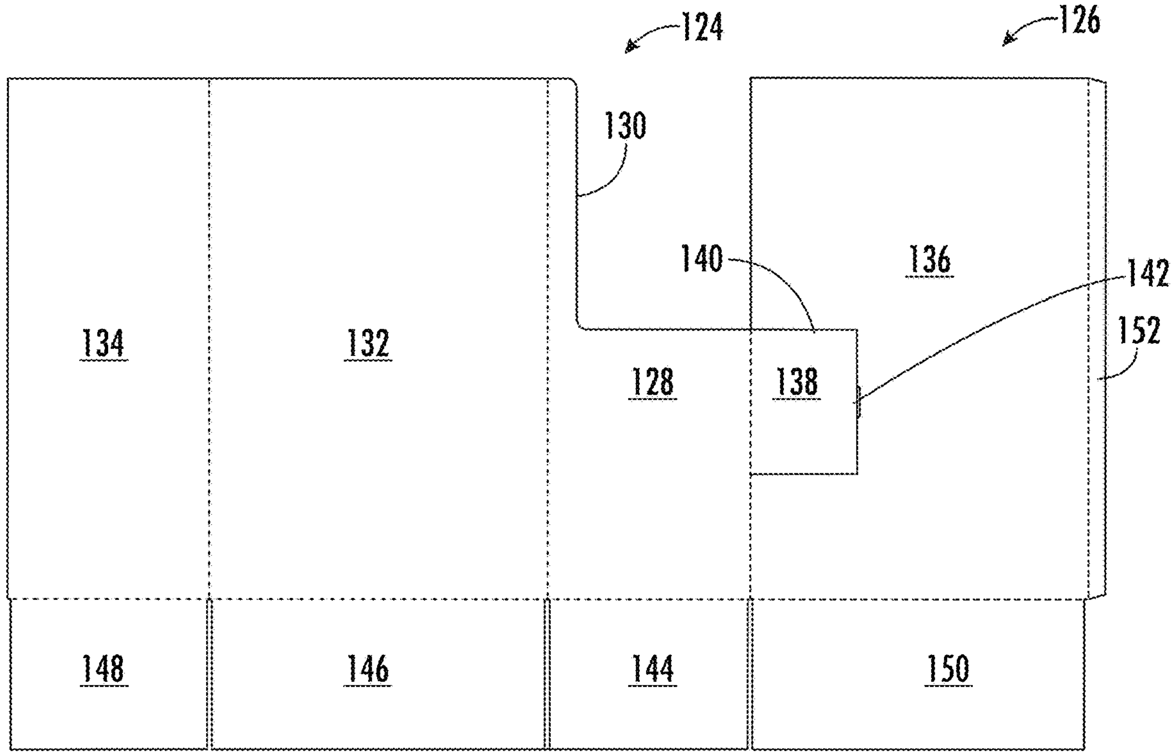
FIG. 12 is a plan view of a die layout for a display of a retail product display assembly, according to an embodiment.

FIG. 12 illustrates a die panel layout of a first display 124 of a retail product display assembly 126 according to another embodiment. The first display 124 is sized to receive, retain, and display the first array of products 22. The first display 124 includes a front panel 128. A cutout 130 is formed through the front panel 128 for access to the displayed products 22. An outer side panel 132 is pivotally connected to the front panel 128. A rear panel 134 is pivotally connected to the outer side panel 132.

An inner side panel 136 is also pivotally connected to the front panel 128. A connector panel 138 is formed in a cutout 140 of the inner side panel 136, pivotally connected to the front panel 128. The connector panel 138 can be pulled out of the inner side panel 136. A tab 142 is provided on the connector panel 138. The inner side panel 136 of the display 124 is left unornamented for side-by-side placement with another display. A first indicia portion is formed on the front panel 128, the outer side panel 132, the rear panel 134, and the connector panel 138.

Bottom panels 144, 146, 148, 150 are each pivotally connected to a lower end of one of the upright panels 128, 132, 134, 136 of the display 124. When each of the upright panels 128, 132, 134, 136 are folded perpendicularly to sequential panels 128, 132, 134, 136, the bottom panels 144, 146, 148, 150 are folded inward to enclose the bottom of the display 124. A tab 152 is pivotally connected to the inner side panel 136 to be folded into the display 124. The tab 152 is adhered or otherwise fastened to an inside of the rear panel 134 to enclose and fasten the upright panels 128, 132, 134, 136.

Figure 13:
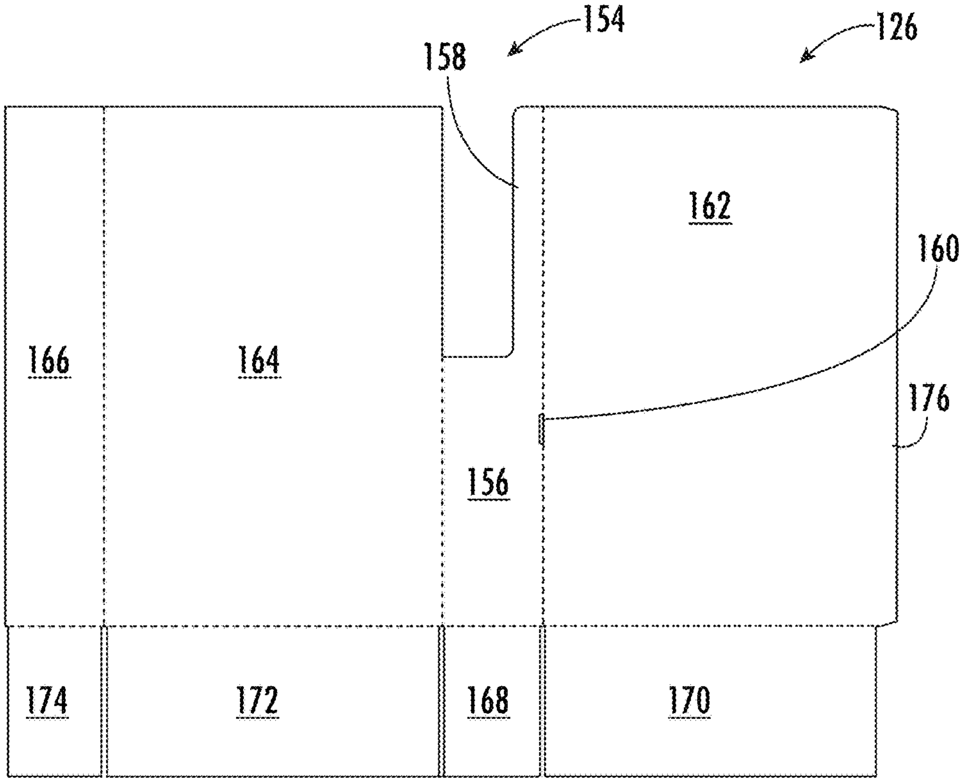
FIG. 13 is a plan view of a die layout for another display of the retail product display assembly of FIG. 12.

FIG. 13 illustrates a die panel layout of a second display 154 of the retail product display assembly 126. The second display 154 includes a front panel 156. A cutout 158 is formed through the front panel 156 for access to the displayed products 24. The cutout 158 is sized to align with the cutout 130 of the first display 124. The cutouts 130, 158 of the displays 124, 154 finish each other to help orient the displays 124, 154 together. A slot 160 is formed in the front panel 156, and is sized to receive the tab 142 of the connector panel 138.

An outer side panel 162 is pivotally connected to the front panel 156. An inner side panel 164 is also pivotally connected to the front panel 156. A rear panel 166 is pivotally connected to the inner side panel 164. A second indicia portion is formed on the front panel 156 except for a region that is covered by the connector panel 138 during assembly. The second indicia portion is also printed on the outer side panel 162, and the rear panel 166.

Bottom panels 168, 170, 172, 174 are each pivotally connected to a lower end of one of the upright panels 156, 162, 164, 166 of the display 154. When each of the upright panels 156, 162, 164, 166 are folded perpendicularly to sequential panels 156, 162, 164, 166, the bottom panels 168, 170, 172, 174 are folded inward to enclose the bottom of the display 154. A tab 176 is pivotally connected to the outer side panel 162 to be folded into the display 154. The tab 176 is adhered or otherwise fastened to an inside of the rear panel 166 to enclose and fasten the upright panels 156, 162, 164, 166.

The inner side panel 164 of the second display 154 is left unornamented for side-by-side placement with the first display 124. The connector panel 138 of the first display 124 extends across the front panel 156 of the second display 154. The connector tab 142 is installed into the slot 160 in the second display front panel 156, thereby connecting the displays 124, 154 together. The header 94 of FIG. 7 may also be installed upon the display assembly 126. The connector panel 138 extends across an unornamented region of the second display front panel 156 to complete the ornamental design of the display assembly 126. Alternatively, the connector panel 138 could be provided by the second display 154.

Figure 14:
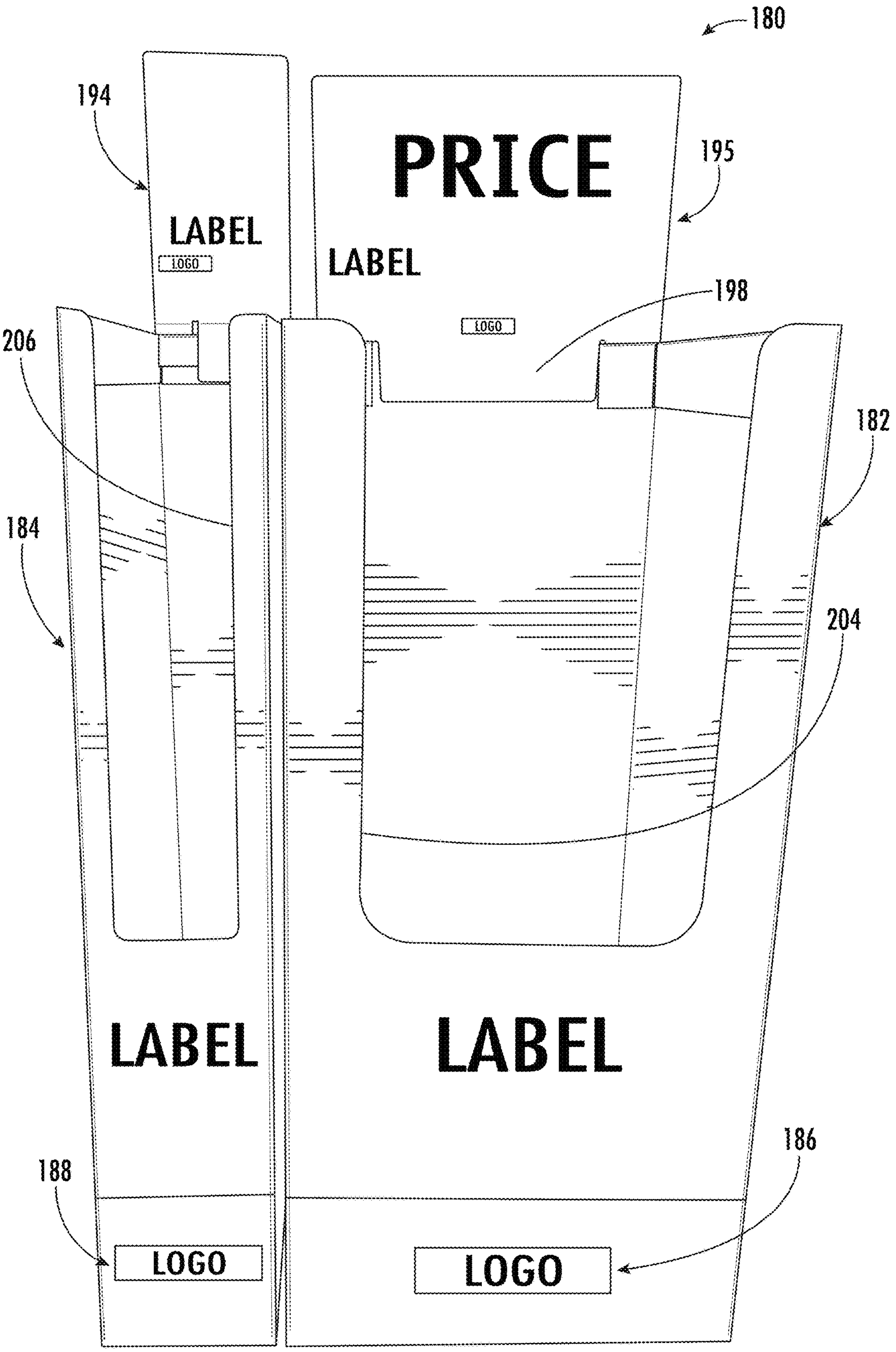
FIG. 14 is a front perspective view of a retail product display assembly according to another embodiment, illustrated disconnected.
Figure 15:
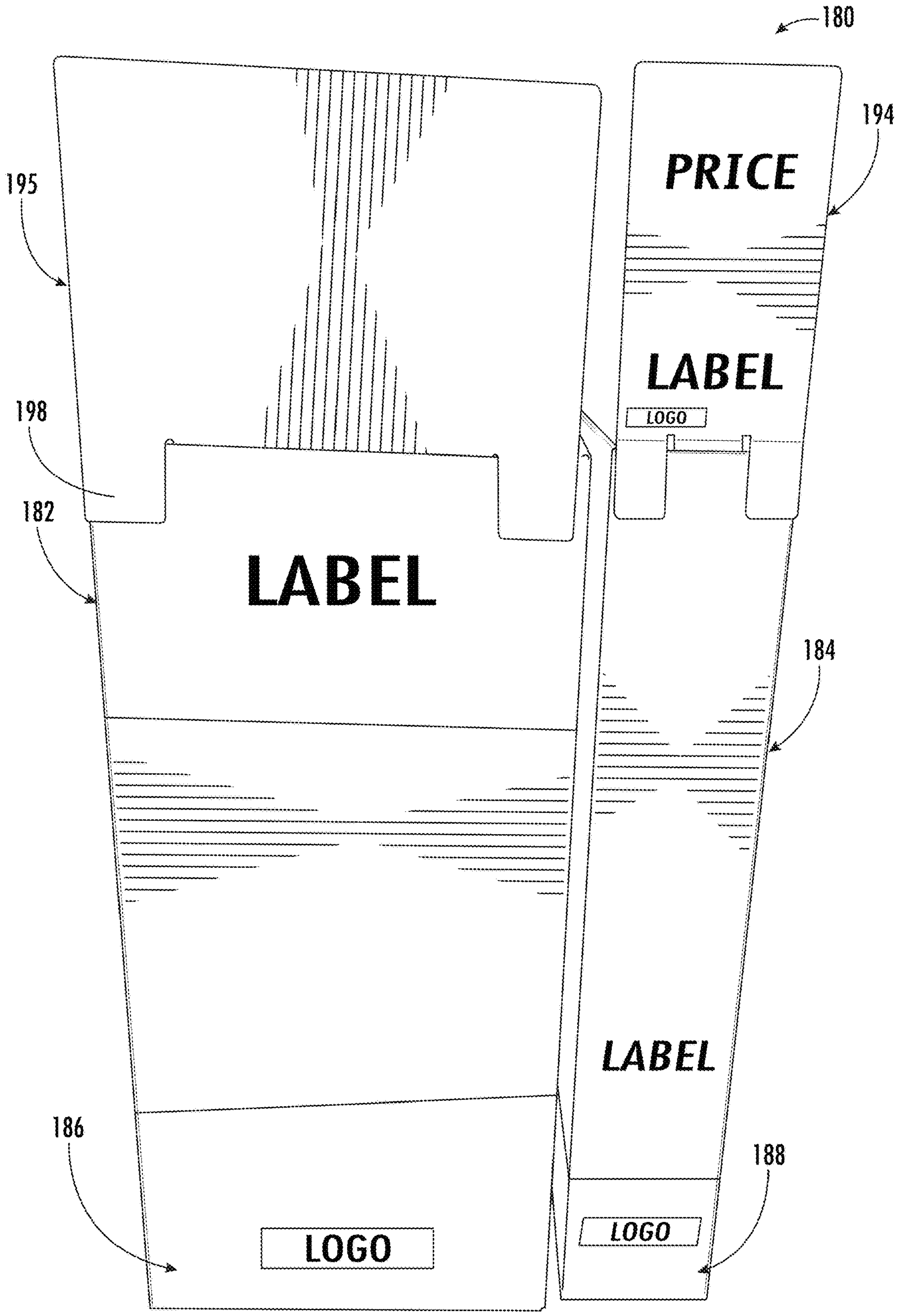
FIG. 15 is a rear perspective view of the retail product display assembly of FIG. 14, illustrated disconnected.

FIGS. 14-17 illustrate a display assembly 180 according to another embodiment. Similar to the prior embodiments, the display assembly 180 includes displays 182, 184 for retaining and displaying the products 22, 24. Each of the displays 182, 184 are separate stand-alone displays 182, 184 that are combined to provide the display assembly 180. The first display 182 includes a first indicia portion 186. Likewise, the second display 184 includes a second indicia portion 188. Each indicia portion 186, 188 provides a portion of a logo, banner, signage, graphic, product information, or the like. The indicia portions 186, 188 are complete so that the displays 182, 184 can each be displayed separately. Each of the displays 182, 184 includes a center cutout 204, 206 so that the displays 182, 184 each appear symmetrical and complete when displayed separately. When combined, both of the indicia portions 186, 188 collectively provide complete display indicia. FIGS. 14 and 15 illustrate the display assembly 180 with the displays 182, 184 disconnected.

Figure 16:
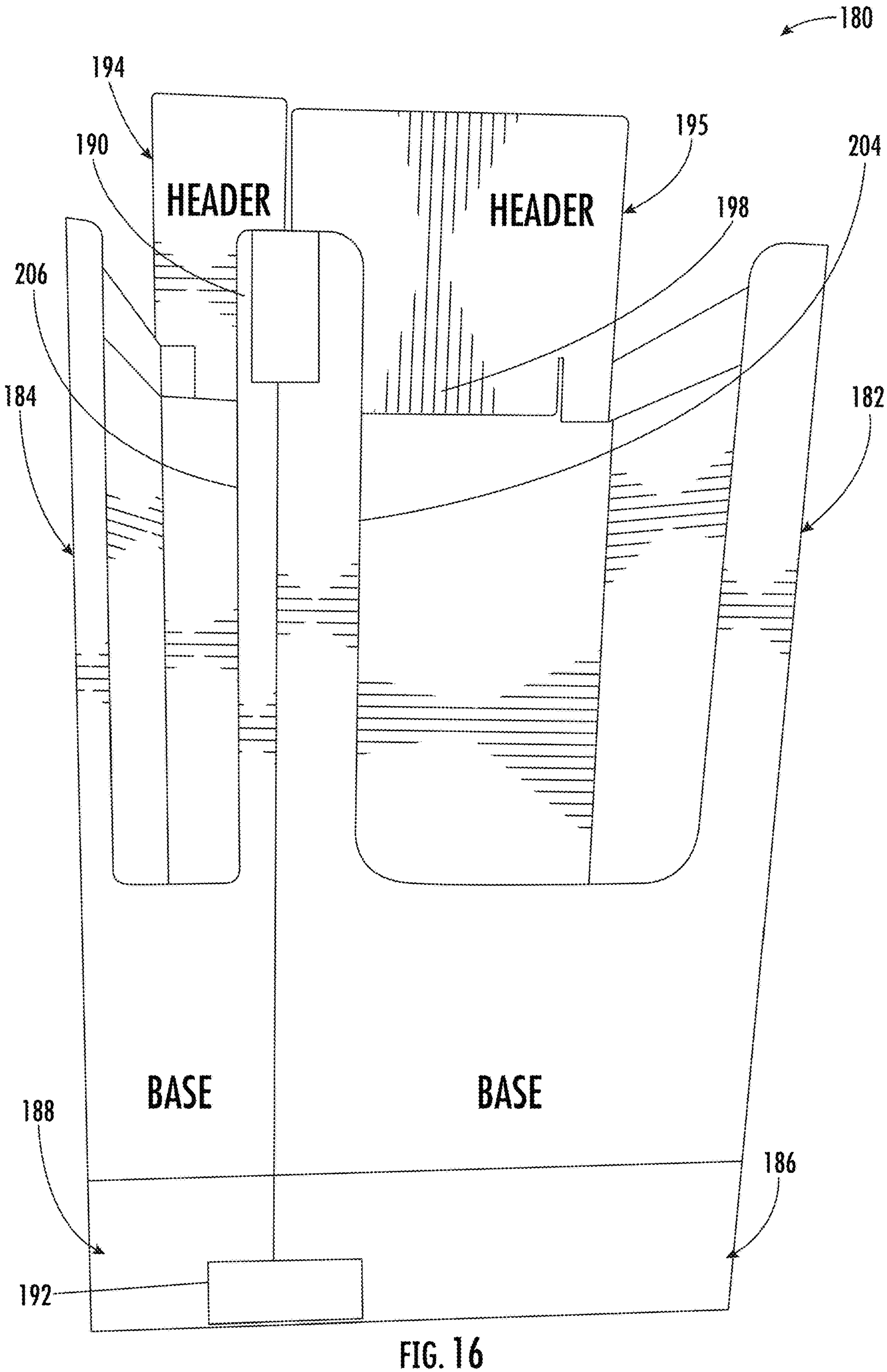
FIG. 16 is another front perspective view of the retail product display assembly of FIG. 14, illustrated connected.
Figure 17:
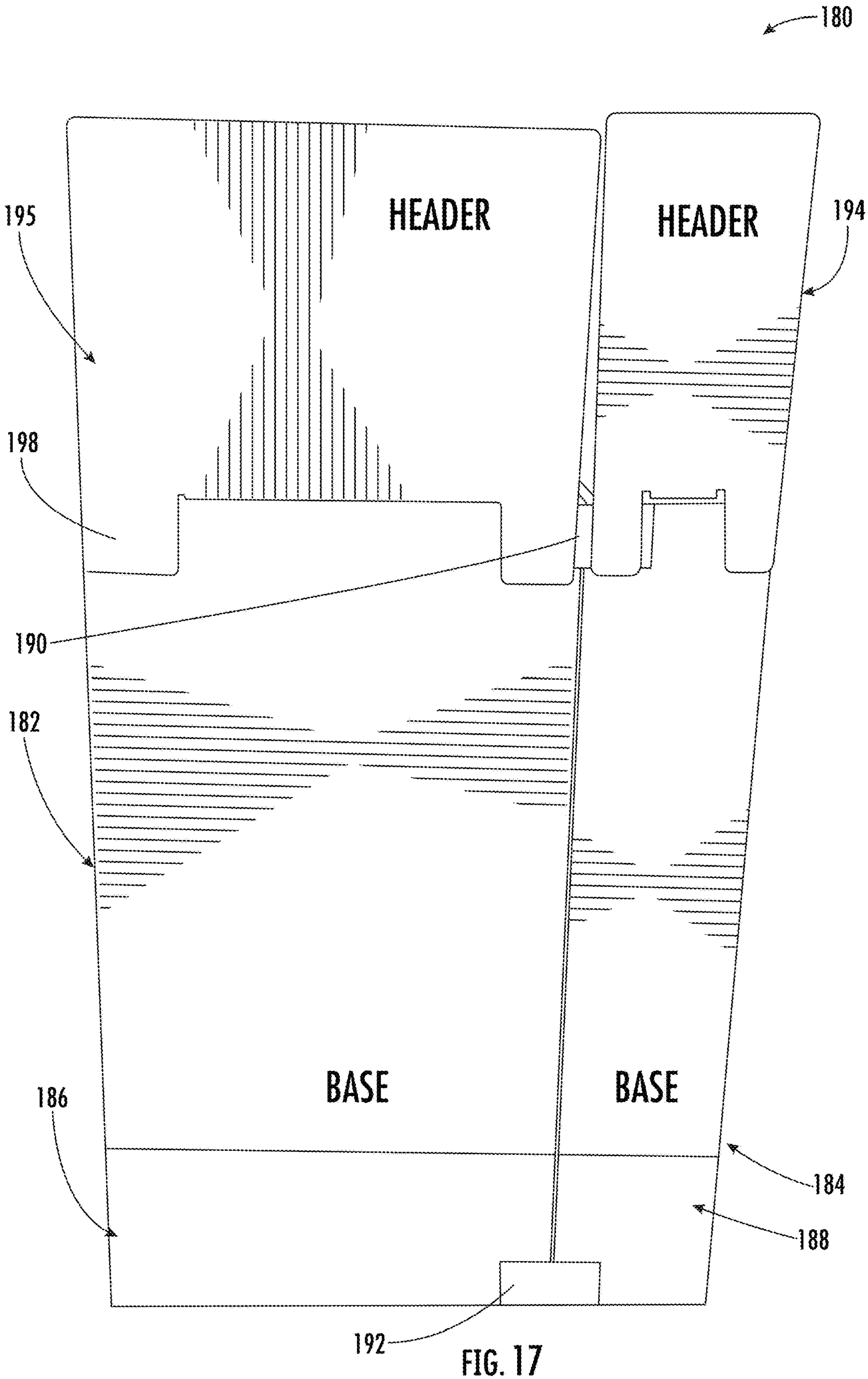
FIG. 17 is another rear perspective view of the retail product display assembly of FIG. 14, illustrated connected.
Figure 18:
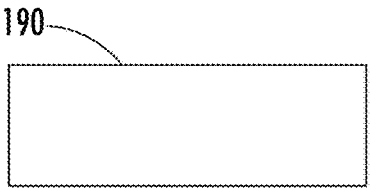
FIG. 18 is a top plan view of a connector of the retail product display assembly of FIG. 14, according to an embodiment.
Figure 19:
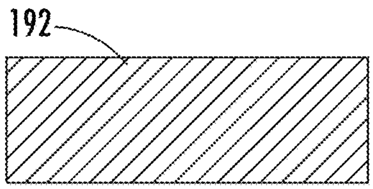
FIG. 19 is a top plan view of another connector of the retail product display assembly of FIG. 14, according to an embodiment.

FIGS. 16 and 17 illustrate the display assembly 180 with a plurality of connectors 190, 192. In the depicted embodiment, the connectors 190, 192 may be stickers 190, 192 or labels 190, 192. The stickers 190, 192 include an exposed surface to match the indicia portions 186, 188 of the displays 182, 184. The stickers 190, 192 also include an adhesive backed rear surface for attachment to the displays 182, 184 to connect the displays 182, 184. The connectors 190, 192 are illustrated in FIGS. 18 and 19 removed from the display assembly 180.

In the depicted embodiment, the indicia portions 186, 188 include regions of solid color, such as a light region and a dark region. Likewise, the stickers 190, 192 include a solid light sticker 190 and a solid dark sticker 192. The stickers 190, 192 could include logos, fonts, graphics, or the like to match corresponding ornamental features on the display assembly 180. By utilizing solid color regions for the stickers 190, 192, misalignment of ornamental features is avoided. Although two pairs of stickers 190, 192 are provided for a quantity of four stickers 190, 192, any suitable number of stickers 190, 192 may be employed.

Figure 20:
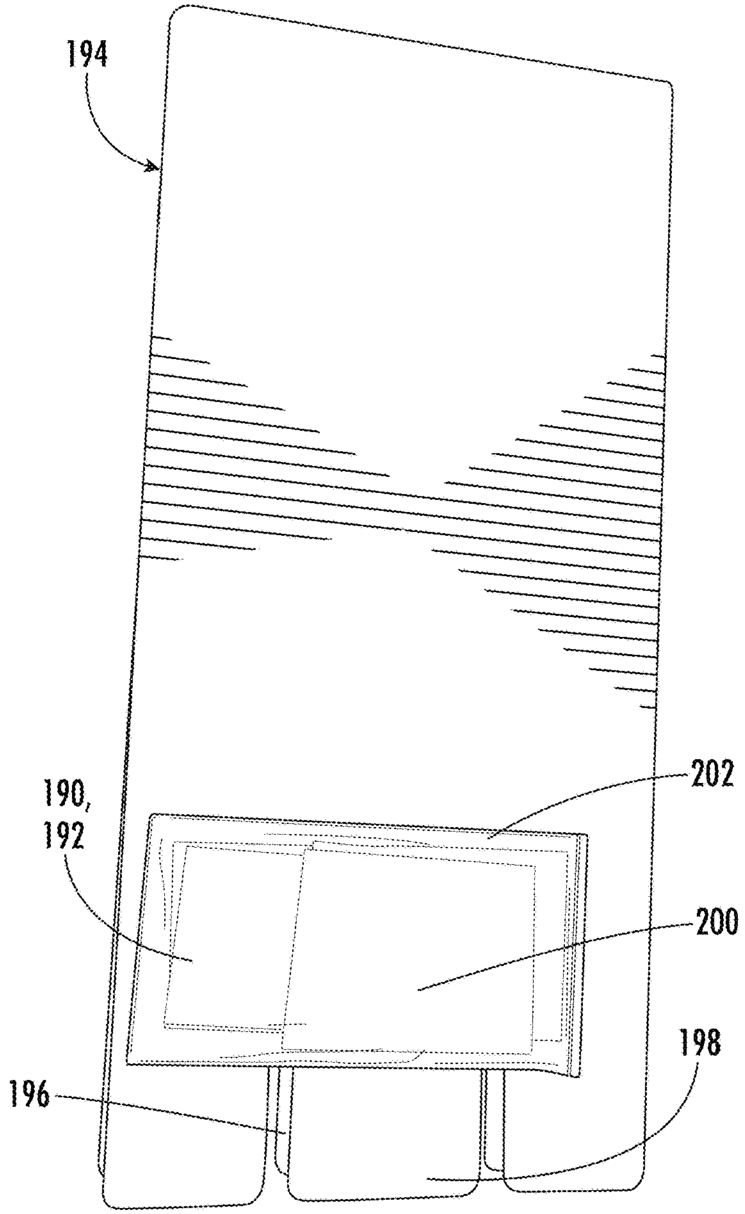
FIG. 20 is a rear perspective view of a header of the retail product display of FIG. 14, according to an embodiment.

FIG. 20 illustrates a header 194 according to an embodiment. A pair of slots 196 are formed through the header 194 to attach the header 194 to the display 184 of the display assembly 180 as illustrated in FIGS. 14-17. The slots 196 provide a series of alternating tabs 198 for alternating on either side of a display panel. A similar header 195 is provided on the display 182 in FIGS. 14-17. The headers 194, 195 may be printed with signage, a banner, graphics, or the like to draw consumer attention to the display assembly 180. The headers 194, 195 can each be shipped with the corresponding display 182, 184 for assembly with the display assembly 180; or the headers 194, 195 can be shipped together with or without one the displays 182, 184.

With reference to FIG. 20, various components of the display assembly 180 may include assembly instructions 200 and printed orientation marks to ensure proper alignment and installation to complete the display assembly 180 and the associated graphics. In the depicted embodiment, the instructions 200 are stored in an envelope or bag 202 attached to one of the headers 194 for shipping with the header 194. The stickers 190, 192 may also be retained within the bag 202. Alternatively, each sticker 190, 192 may be provided with a label, an adhesive, and a removable backer. The stickers 190, 192 may be installed to one of the displays 182, 184 prior to shipping, according to an embodiment. Upon receipt at the retailer, an end user may remove the backer from the sticker 190, 192 to expose the adhesive, and then apply the adhesive to the other display 182, 184 to connect the displays 182, 184 together.

Figure 21:
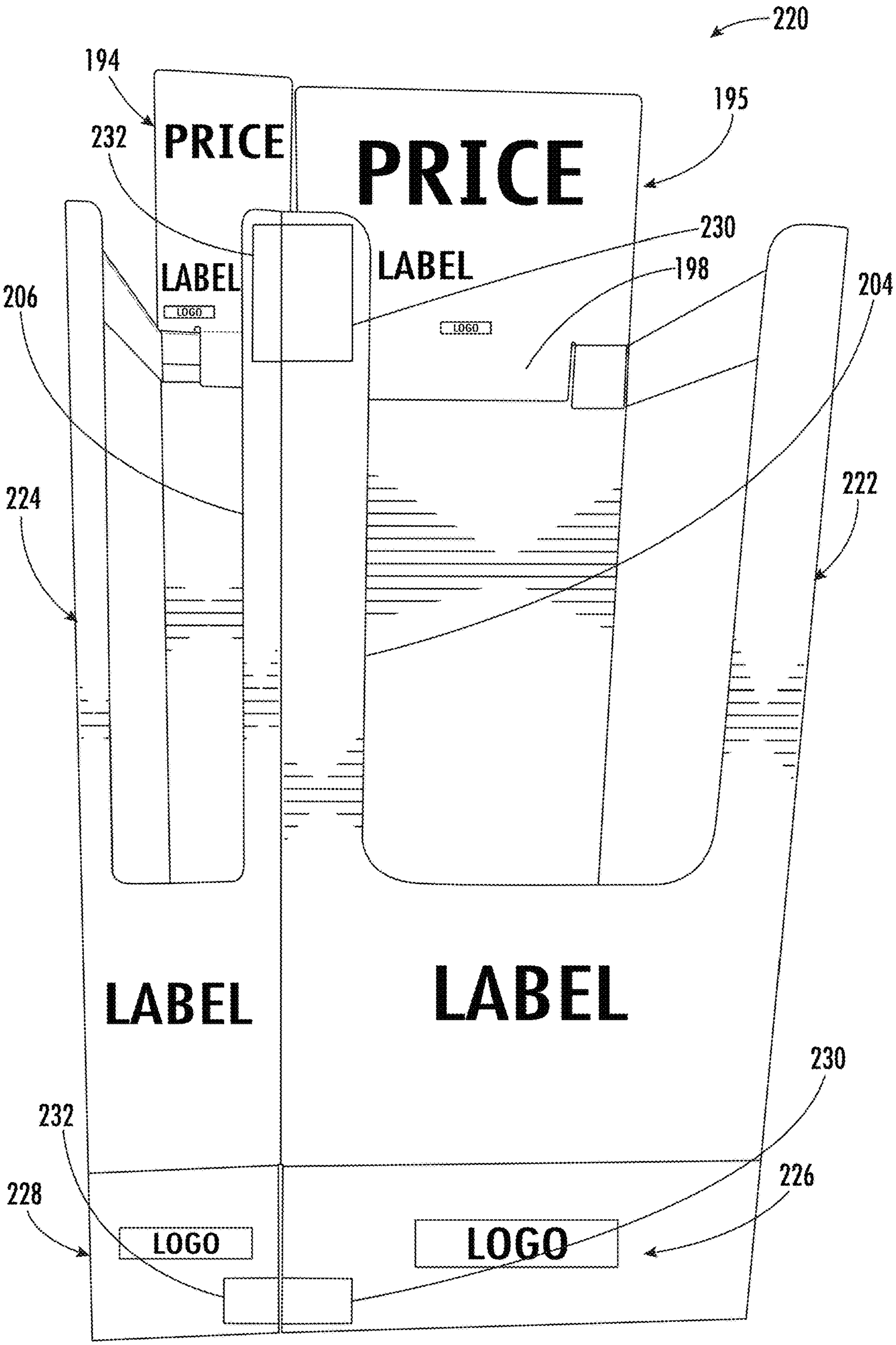
FIG. 21 is a front perspective view of a retail product display assembly according to another embodiment.

FIG. 21 illustrates a display assembly 220 according to another embodiment. Similar to the prior embodiments, the display assembly 220 includes displays 222, 224 for retaining and displaying the products 22, 24. Each of the displays 222, 224 are separate stand-alone displays 222, 224 that are combined to provide the display assembly 220. The first display 222 includes a first indicia portion 226. Likewise, the second display 224 includes a second indicia portion 228. Each indicia portion 226, 228 provides a portion of a logo, banner, signage, graphic, product information, or the like. The indicia portions 226, 228 are each incomplete. However, when combined with the stickers 190, 192, the combination of the indicia portions 226, 228 with the stickers 190, 192 collectively provides complete display indicia. FIG. 21 illustrate the display assembly 220 with the displays 222, 224 disconnected.

The displays 222, 224 each include an incomplete portion 230, 232 within the indicia portions 226, 228. The incomplete portions 230, 232 may provide an incomplete, off looking, or out-of-place appearance on each merchandiser display 222, 224. The incomplete appearance is then completed with the application of the stickers 190, 192 to provide a uniform or harmonized appearance. The incomplete portions 230, 232 may include text to identify the appropriate sticker 190, 192. The incomplete portions 230, 232 may motivate or incentivize the retailer to combine and connect the displays 222, 224 as a completed and connected display assembly 220.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A display assembly comprising:
- a first display sized to receive a plurality of first products for display, wherein a first display indicia portion is provided on the first display, wherein the first display indicia portion is incomplete;
- a second display sized to receive a plurality of second products for display, wherein a second display indicia portion is provided on the second display, wherein the second display indicia portion is incomplete;
- a plurality of first products received and displayed within the first display; and
- a plurality of second products received and displayed within the second display;
- wherein the incomplete first display indicia portion and the incomplete second display indicia portion cooperate to collectively provide a complete display indicia; and
- wherein the plurality of second products is different from the plurality of first products.

2. The display assembly of claim 1 further comprising a connector to connect the first display and the second display.

3. The display assembly of claim 2 wherein a third display indicia portion is provided on the connector; and
- wherein the first display indicia portion, the second display indicia portion and the third display indicia portion cooperate to collectively provide complete display indicia.

4. The display assembly of claim 3 wherein the connector comprises a sticker.

5. The display assembly of claim 3 wherein the connector is pending from the first display or the second display; and
- wherein the connector comprises a panel that extends from the first display to overlap and connect to the second display.

6. The display assembly of claim 3 wherein the connector comprises a band sized to extend about an overall perimeter of the combined first and second displays in a display position of the combined first and second displays.

7. The display assembly of claim 1 wherein an inner side panel of the first display is unornamented for side-by-side placement with the second display.

8. The display assembly of claim 1 wherein the incomplete first display indicia portion includes an unprinted area.

9. The display assembly of claim 1 wherein the plurality of first products further comprises packaged faucets; and wherein the plurality of second products further comprises bath hardware.

10. A method to display products at retail comprising:
- receiving a first display with a plurality of first products, wherein a first incomplete display indicia portion is provided on the first display;
- receiving a second display with a plurality of second products that are different from the plurality of first products, wherein a second incomplete display indicia portion is provided on the second display;
- displaying the first display in a retail location;
- displaying the second display in the retail location; and
- assembling the first display to the second display so that the first incomplete display indicia portion and the second incomplete display indicia portion collectively provide complete display indicia when assembled.

11. The method of claim 10 further comprising a step of connecting the first display to the second display with a connector, wherein a third incomplete display indicia portion is provided on the connector, so that the first incomplete display indicia portion, the second incomplete display indicia portion and the third incomplete display indicia portion cooperate to collectively provide complete display indicia when connected.

12. The display assembly of claim 1 wherein the incomplete first display indicia portion illustrates a first incomplete portion of a logo, a banner, signage, a graphic, a product image, or product information;

wherein the incomplete second display indicia portion illustrates a second incomplete portion of the logo, the banner, the signage, the graphic, the product image, or the product information; and wherein the complete display indicia illustrate a complete logo, banner, signage, graphic, product image, or product information.

13. The display assembly of claim 1 wherein the incomplete first display indicia portion illustrates a first incomplete portion of a product image;

wherein the incomplete second display indicia portion illustrates a second incomplete portion of the product image; and wherein the complete display indicia illustrate a complete product image.

14. The display assembly of claim 1 wherein the incomplete first display indicia portion illustrates a first incomplete portion of product information;

wherein the incomplete second display indicia portion illustrates a second incomplete portion of the product information; and wherein the complete display indicia illustrate complete product information.

15. The display assembly of claim 3 wherein the third display indicia portion is incomplete.

16. A display assembly comprising:

a first display sized to receive a plurality of first products for display, wherein a first display indicia portion is provided on the first display, wherein the first display indicia portion is incomplete;

a second display sized to receive a plurality of second products for display, wherein a second display indicia portion is provided on the second display;

a plurality of first products received and displayed within the first display;

a plurality of second products received and displayed within the second display; and a connector to connect the first display and the second display, wherein a third display indicia portion is provided on the connector, wherein the third display indicia portion is incomplete;

wherein the incomplete first display indicia portion and the incomplete third display indicia portion cooperate to collectively provide a complete display indicia; and wherein the plurality of second products is different from the plurality of first products.

17. The display assembly of claim 16 wherein the connector comprises a sticker.

18. The display assembly of claim 16 wherein the connector is pending from the first display or the second display; and wherein the connector comprises a panel that extends from the second display to overlap and connect to the first display.

19. The display assembly of claim 16 wherein the connector comprises a band sized to extend about an overall perimeter of the combined first and second displays in a display position of the combined first and second displays.

20. The display assembly of claim 16 wherein the incomplete first display indicia portion illustrates a first incomplete portion of a logo, a banner, signage, a graphic, a product image, or product information;

wherein the incomplete third display indicia portion illustrates a second incomplete portion of the logo, the banner, the signage, the graphic, the product image, or the product information; and wherein the complete display indicia illustrate a complete logo, banner, signage, graphic, product image, or product information.

21. The display assembly of claim 16 wherein the incomplete first display indicia portion illustrates a first incomplete portion of a product image;

wherein the incomplete third display indicia portion illustrates a second incomplete portion of the product image; and wherein the complete display indicia illustrate a complete product image.

22. The display assembly of claim 16 wherein the incomplete first display indicia portion illustrates a first incomplete portion of product information;

wherein the incomplete third display indicia portion illustrates a second incomplete portion of the product information; and wherein the complete display indicia illustrate complete product information.

* * * * *